United States Patent
Smith

(10) Patent No.: US 8,215,467 B2
(45) Date of Patent: Jul. 10, 2012

(54) MULTI-GAP MAGNETORHEOLOGICAL FLUID CLUTCH

(75) Inventor: Anthony L. Smith, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 916 days.

(21) Appl. No.: 12/255,043

(22) Filed: Oct. 21, 2008

(65) Prior Publication Data

US 2010/0096233 A1 Apr. 22, 2010

(51) Int. Cl.
*F16D 37/02* (2006.01)

(52) U.S. Cl. .................. 192/21.5; 188/267; 188/267.2

(58) Field of Classification Search .............. 192/21.5, 192/58.61

See application file for complete search history.

(56) References Cited

U.S. PATENT DOCUMENTS

| | | | |
|---|---|---|---|
| 2,832,449 A * | 4/1958 | Winther | 192/21.5 |
| 6,318,531 B1 | 11/2001 | Usoro et al. | |
| 6,619,453 B2 * | 9/2003 | Stretch | 192/21.5 |
| 7,422,093 B2 | 9/2008 | Murty et al. | |

* cited by examiner

*Primary Examiner* — David D Le
*Assistant Examiner* — Ryan Dodd
(74) *Attorney, Agent, or Firm* — Quinn Law Group, PLLC

(57) ABSTRACT

A vehicle has a multi-gap magnetorheological fluid (MRF) clutch connecting rotatable input and output members, and includes a drum connected to the output member and a rotor connected to the input member. The drum contains a magnetically-permeable stator and a magnetic core, while the rotor has a magnetically-permeable member extending axially into the drum to define an outer working gap in conjunction with the stator and an inner working gap in conjunction with the magnetic core. MR fluid fills the working gaps, and a magnetic field generator or electromagnet induces a magnetic field when electrical current is passed through a field coil therein to change an apparent viscosity of the MR fluid. The inner and outer working gaps have a predetermined inner to outer gap thickness ratio balancing the slip power dissipation per unit volume in each of the working gaps.

13 Claims, 2 Drawing Sheets

MULTI-GAP MAGNETORHEOLOGICAL FLUID CLUTCH

TECHNICAL FIELD

This invention relates generally to torque transmitting devices or clutches, and in particular to a magnetorheological fluid clutch having a plurality of working gaps.

BACKGROUND OF THE INVENTION

Magnetorheological (MR) fluids include ferromagnetic particles that are suspended in a carrier fluid such as natural or synthetic hydrocarbon oil. The apparent viscosity of the MR fluid is rapidly modified when MR fluid is exposed to a magnetic field, with associated torque transmitting properties of the MR fluid increasing in conjunction with the increase in viscosity. This process is also readily reversible, thus allowing MR fluids to reversibly and almost instantaneously change from a free-flowing liquid to a semi-solid form.

In an MRF clutch in particular, controllable change in the yield stress of the MR fluid is produced by the formation of columns or lines of magnetized particles across one or more annular spaces or working gaps containing the MR fluid, with the alignment occurring in the direction of the applied magnetic field. An increase in yield stress can be used for various useful purposes, e.g., to control the fluid coupling effect between two rotating members, to change the flow rate of the MR fluid through a conduit or an orifice, etc. The change in yield stress occurs in milliseconds, and is readily reversible as noted above. Since the magnetic field can be controlled by the application of an electrical current to a field coil of an electromagnet, the yield stress of the MR fluid, and thus the applied clutch torque, can be precisely controlled.

An MRF clutch utilizes the phenomenon described above to provide a variable torque output. However, MRF clutches have a number of inherent limitations, one being a relatively low torque density in comparison to other torque-transmitting devices, e.g., hydraulically-actuated clutches. Another limitation is the potentially high electrical power consumption of any electromagnet used as a magnetic field generator. The result can be a relatively large clutch package, and/or an increased rate of power consumption, each of which typically corresponds with an elevated MR fluid temperature and corresponding fluid oxidation rate. An elevated MR fluid temperature and oxidation rate in turn can shorten the useful service life of the MR fluid, and potentially the useful service life of the MRF clutch itself.

SUMMARY OF THE INVENTION

Accordingly, an MRF clutch is provided that can be used as an integral portion of any assembly or system in which the selective connection of a pair of rotatable members is desirable. Within the MRF clutch itself, a plurality of working gaps are filled with MR fluid, and torque is transferred across the working gaps as the viscosity of the MR fluid changes when exposed to an applied magnetic field. Unlike conventional MRF clutch designs having a uniform or equal gap thickness, the gap thickness of each of the two or more working gaps of the MRF clutch provided herein have disparate thicknesses, with these thicknesses being determined using a predetermined magnetic flux density ratio taken at the locus or position of the various working gaps.

Within the scope of the invention, an inner working gap and at least one outer working gap are provided, with the terms "inner" and "outer" referring to the radial position of the working gaps relative to the fixed position of a magnetic field generator, e.g., an electromagnet as described below. When three or more working gaps are used instead of just two, one or more intermediate gaps can be used in conjunction with the inner and outer working gaps. The disparate working gap thicknesses act to balance the slip power dissipated per unit volume or q''' of the MR fluid during a given torque transmitting event. The gap size variation as set forth below lowers a maximum temperature of the MR fluid, thus reducing the oxidation rate of the MR fluid while extending its useful life. The slip power limit of the MRF clutch as disclosed herein is thereby optimized relative to a conventional MRF clutch having a uniform or equal gap thickness.

In particular, an MRF clutch selectively connects a rotatable first member with a rotatable second member. The MRF clutch includes a drum containing a stator, which in one embodiment is operatively connected to the second member, a rotor which in the same embodiment is operatively connected to the first member and has a magnetically-permeable member extending axially into the stator, with the magnetically-permeable member at least partially defining an inner working gap in conjunction with an axially-outward portion of the stator and an outer working gap in conjunction with an axially-inward portion of the stator. For simplicity the first member is shown herein as an input member, and the second member is shown as the output member, although within the scope of the art these may be reversed. MR fluid fills each of the working gaps, and a magnetic field generator generates or induces a magnetic field for changing an apparent viscosity of the MR fluid. The inner and outer working gaps have a predetermined inner to outer gap thickness ratio greater than approximately 1.10:1, i.e., an outer to inner gap thickness of less than approximately 0.90:1.0.

A vehicle is also provided that includes an input member, an output member, an MRF clutch assembly having MR fluid, a magnetic core, and an electromagnet, and a battery that is electrically connectable to the electromagnet, wherein a supply of energy from the battery to the electromagnet generates a magnetic field adapted to change an apparent viscosity of the MR fluid. The MRF clutch assembly includes a rotor connected to the output member and a drum containing a stator, the drum being connected to the input member, with the rotor and stator together defining a plurality of disparately-sized working gaps each containing the MR fluid. The inner and outer working gaps have a predetermined inner to outer gap thickness ratio greater than approximately 1.10:1, i.e., an outer to inner gap thickness of less than approximately 0.90:1.0, with the rotor having an axial member that extends at least partially into the drum to define along with the respective stator and magnetic core an inner working gap and an outer working gap.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
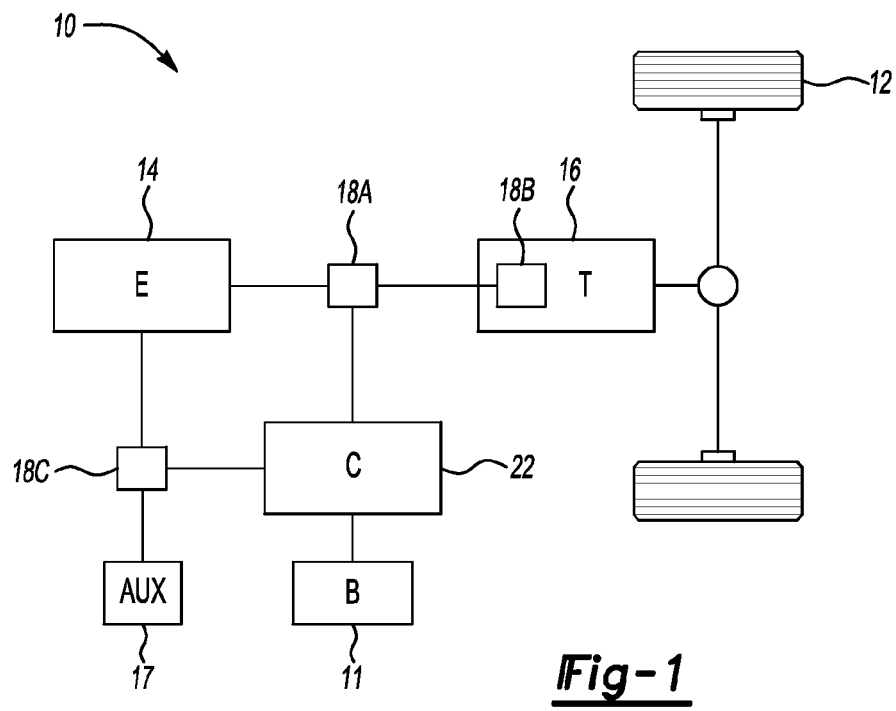
FIG. 1 is a schematic diagram of a vehicle having a multi-gap magnetorheological fluid (MRF) clutch in accordance with the present invention.

Referring to the drawings, wherein like reference numbers refer to like components throughout the several views, and beginning with FIG. 1, a vehicle 10 includes an internal combustion engine (E) 14 that can be directly or selectively connected to a transmission (T) 16. When selectively connected to the transmission 16, torque from the engine 14 can be transmitted to the transmission 16 using a first torque transmitting device or clutch 18A. Whether directly or indirectly connected to the engine 14, torque from the engine 14 is ultimately transmitted through the transmission 16 to a set of drive wheels 12 to thereby propel the vehicle 10.

Figure 2:
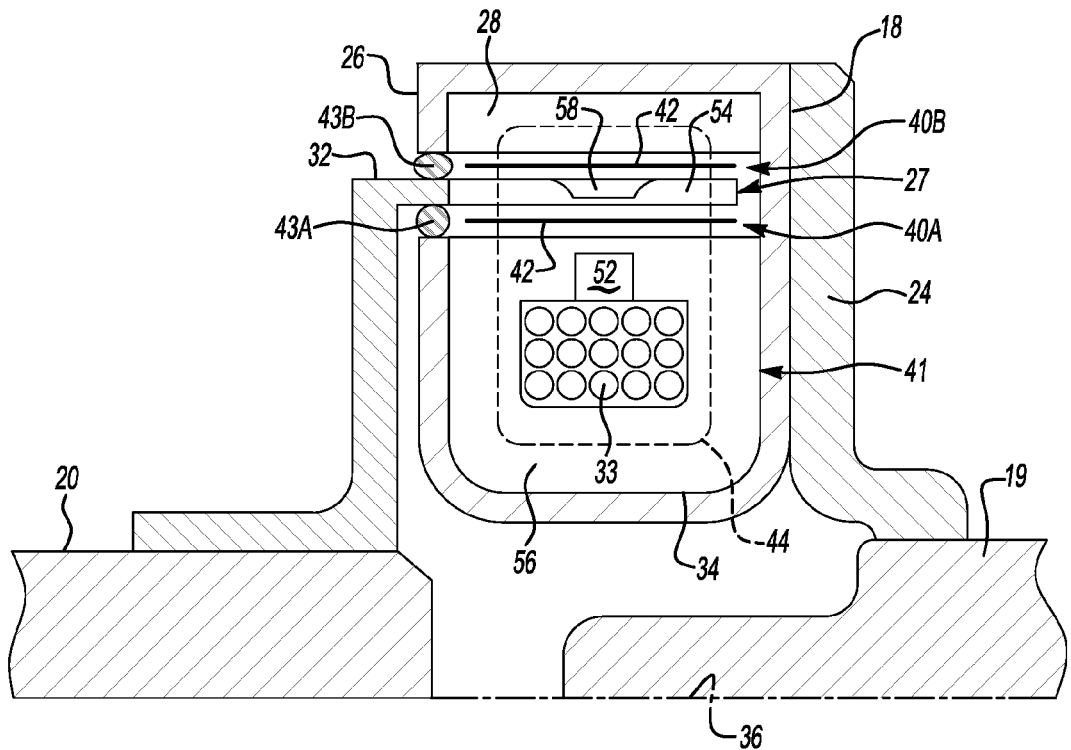
FIG. 2 is a schematic partial cross-sectional side view of an exemplary MRF clutch.

Within the transmission 16, the engine 14 can power or energize a rotatable member of the clutch 18A, e.g., the input member 20 shown in FIG. 2. Within the transmission 16, a second torque-transmitting device or clutch 18B can be used to selectively transfer torque between different rotatable members thereof, e.g., between different gear members of the various gear sets, shafts, etc. When such a clutch 18A is not used, the engine 14 can be directly connected to the transmission 16, or indirectly connected via a hydrodynamic torque converter (not shown). Likewise, a third torque-transfer device or clutch 18C can be used to selectively connect the engine 14 with an onboard auxiliary system or device (AUX) 17 such as, but not limited to, a belt or gear-driven pump, a motorized assembly, and/or other auxiliary device.

While the clutches 18A, 18B, 18C can be used for transferring or transmitting torque in a vehicle such as the vehicle 10 of FIG. 1, the vehicle 10 is just one exemplary system that can utilize such clutches. Those of ordinary skill in the art will recognize other mechanical systems in which the transfer of torque from one rotating member to another is desirable, such as but not limited to mechanized manufacturing equipment, robots, electromechanical devices, etc. Without respect to the particular mechanical or electromechanical system in which the clutches 18A, 18B, and/or 18C are ultimately housed, at least one of the clutches 18A, 18B, and/or 18C shown in FIG. 1 is configured as multi-gap magnetorheological fluid (MRF) clutches of the type described below with reference to FIGS. 2 and 3.

As noted above, an MRF clutch uses MR fluid having an apparent viscosity that is selectively variable or controllable in response to an applied magnetic field. As the apparent viscosity of the MR fluid is increased, torque transfer through the MR fluid is increased. An electronic control unit or controller (C) 22 and a battery 11 or other suitable energy storage device can be used to provide a variable electrical current to thereby control the intensity of an induced or applied magnetic field, and therefore the MRF clutch 18A, 18B, and/or 18C can be selectively controlled independently of the speed of the engine 14.

Referring to FIG. 2, an exemplary MRF clutch 18, which can be used for any or all of the MRF clutches 18A, 18B, 18C of FIG. 1, selectively joins or couples a pair of rotatable members, exemplified herein as the respective output and input members 19, 20. A connecting member or sleeve 24 can be directly connected to or interposed between the output member 19 and a rotatable outer housing or drum 26 of the MRF clutch 18 to rotate in conjunction therewith. That is, rotation of the input member 20 in conjunction with an actuated MRF clutch 18 ultimately rotates the drum 26, with the MRF clutch 18 operable for selectively transferring or transmitting torque from the input member 20 to the output member 19 as described below. However, within the scope of the invention torque transfer can occur in the opposite direction, i.e., with the output member 19 rotating the drum 26, and ultimately transferring torque to the input member 20 via the rotor 32.

The MRF clutch 18 includes a magnetically permeable stator 28 within the drum 26, a rotor 32, and a magnetic field generator 41. The rotor 32, having a rotational degree of freedom with respect to the stator 28, is journaled, splined, or otherwise directly connected to the input member 20 to rotate in conjunction therewith about a rotational axis 36. The rotor 32 includes an axial member 27 which at least partially defines at least a pair of respective inner and outer working gaps 40A and 40B as discussed in more detail below, with a volume of MR fluid 42 substantially filling the working gaps 40A, 40B. As noted above, although not shown in FIG. 2 for clarity, one or more intermediate working gaps may be disposed between the working gaps 40A, 40B within the scope of the invention.

The magnetic field generator 41 is in field communication with the MR fluid 42 in each of the working gaps 40A, 40B, with the magnetic field illustrated generally in FIG. 2 by a set of magnetic flux lines 44. The stator 28 and the rotor 32 each include respective magnetic or magnetically-permeable portions 54, 56 and non-magnetic portions 52, 58, which serve to guide the magnetic field or flux lines 44 in a manner suitable for the purposes disclosed herein. Suitable magnetizable materials for use as the magnetic portions 54, 56 and stator 28 can include but are not limited to: iron, steel, carbonyl iron, etc., or a combination comprising at least one of the exemplary magnetizable materials described above. Suitable non-magnetic materials for use as the non-magnetic materials 52, 58 can include, but are not limited to, stainless steel, aluminum, brass, plastics, etc., or a combination thereof. Alternatively, an air gap may be employed in place of or in addition to the use of non-magnetic portions, as will be understood by those of ordinary skill in the art.

The magnetic field generator 41 can be configured as an electromagnet as shown in FIG. 2, including a magnetic core 34 and a field coil 33 that is electrically energized via the battery 11 of FIG. 1. Exemplary fluid seals 43A, 43B serve to prevent leakage of the MR fluid 42 from the working gaps 40A, 40B. While exemplary fluid seals 43A, 43B are depicted in FIG. 2, it will be appreciated that other arrangements or sealing devices may also be employed without departing from the scope of the invention.

An exemplary composition for the MR fluid 42 includes magnetizable particles, a carrier fluid, and additives. By way of example, the magnetizable particles of the MR fluid 42 can include paramagnetic, super-paramagnetic, or ferromagnetic compounds or a combination thereof. The magnetizable particles can be comprised of materials such as but not limited to iron, iron oxide, iron nitride, iron carbide, carbonyl iron, chromium dioxide, low carbon steel, silicon steel, nickel, cobalt, or the like, or a combination thereof. The term "iron oxide" can include all forms of pure iron oxide, such as, for example, $Fe_2O_3$ and $Fe_3O_4$, as well as those containing small amounts of other elements such as manganese, zinc, barium, etc. Specific examples of iron oxide include ferrites and magnetites. In addition, the magnetizable particles can be comprised of alloys of iron, such as, for example, those containing aluminum, silicon, cobalt, nickel, vanadium, molybdenum, chromium, tungsten, manganese, copper, or a combination thereof.

The magnetizable particles generally can have an aspect ratio of approximately 1 and an average particle size of approximately 0.1 micrometers to 500 micrometers, depending on the particular design parameters of the MRF clutch 18. Likewise, high aspect ratio magnetizable particles having an aspect ratio of greater than or equal to about 1.5 may also be used if desired. The number of magnetizable particles in the MR fluid 42 depends upon the desired magnetic activity and viscosity, in one embodiment ranging from approximately 40 percent to approximately 50 percent volume fraction for the MR fluid 42.

Regardless of the specific composition of the MR fluid 42, when energized via the battery 11 or other suitable energy storage device the magnetic field generator 41 creates a magnetic field (flux lines 44), which ultimately passes through the MR fluid 42 filling the working gaps 40A, 40B. That is, a magnetic field is electrically induced around the wires of the field coil 33, radiating outward therefrom to produce the resultant magnetic field (flux lines 44). As will be understood by those of ordinary skill in the art, the magnetic field naturally weakens in a direction progressing radially-outward away from the wires of the field coil 33, with the magnetic field strengthening in closer proximity to the field coil 33. While shown schematically as a single box in FIG. 2 for clarity, it is understood that the magnetic field lines of an actual magnetic field are concentrically circular with respect to the magnetic field generator 41, and the direction of circulation of the magnetic field itself is dependent upon the direction of current flow within the field coil 33. These factors are at least partially controllable via the controller 22 of FIG. 1 and the battery 11.

When the field coil 33 is electrically energized, the magnetic particles suspended in the carrier of the MR fluid 42 will align with the induced magnetic field (flux lines 44), thereby increasing the apparent viscosity of the MR fluid 42. The increase in viscosity increases the shear strength of the MR fluid 42, resulting in torque transfer from the input member 20 to the output member 19 through the MRF clutch 18. The output member 19 can then be used directly or indirectly for any suitable purpose, such as to propel the vehicle 10, and/or to energize one or more auxiliary systems 17 of FIG. 1, as will be understood by those of ordinary skill in the art.

Still referring to FIG. 2, and within the scope of the present invention, the inner and outer working gaps 40A, 40B have a respective gap size or thickness $t_i$, and $t_o$, with the subscript designations "i" and "o" referring herein to the respective inner and outer radial positions of the working gaps 40A, 40B with respect to the proximity to the magnetic field generator 41. That is, regardless of the number of working gaps, the most radially-inward of any adjacent pair can be referred to as the inner working gap, with the other of the pair referred to as the outer working gap. While only two working gaps are shown in FIG. 2 for simplicity, one or more intermediate gaps can be provided between the working gaps 40A, 40B within the scope of the invention as noted above, with the axial member 27 sized, shaped, or otherwise configured to at least partially define each gap. Unlike conventional dual-gap MRF clutch designs having uniform gap thicknesses, the working gaps 40A, 40B of the MRF clutch 18 are configured to have disparate thicknesses selected using the magnetic flux densities taken at the locus or radial positions of each of the working gaps 40A, 40B.

That is, the respective gap thicknesses $t_o$ and $t_i$ are sized in conformance with a predetermined threshold ratio. By sufficiently varying the gap thicknesses $t_o$ and $t_i$ from each other as set forth below, the slip power dissipated per unit volume or q''' value of the MR fluid 42 is thereby balanced in each of the working gaps 40A, 40B, thus lowering the temperature of the MR fluid 42. Since the oxidation rate of the MR fluid 42 is itself temperature-dependent, oxidation of the MR fluid 42 progresses at a reduced rate relative to uniform gap designs, thus improving the long term durability of the MRF clutch 18.

More particularly, as a radius ($r_i$) of the inner working gap 40A measured from the magnetic field generator 41 is necessarily less than a radius ($r_o$) of the outer working gap 40B by virtue of the more proximate position of the inner working gap 40A relative to the fixed position of the magnetic field generator 41, the magnetic flux density $B_i$ of the inner working gap 40A is higher than the magnetic flux density $B_o$ in the outer working gap 40B. The disparity in these flux densities can also be caused by a certain amount of flux leakage in the rotor 32, edge effects, etc. While not shown in FIG. 2 for simplicity, flux leakage can be present via a shunt or small magnetic portion radially below non-magnetic portion 58, a device which can facilitate manufacturing of the MRF clutch 18, thus allowing the rotor 32 to be constructed of one piece. Sizing of the working gaps 40A, 40B can also affect the flux leakage rate, so is itself a design consideration.

As will be understood by those of ordinary skill in the art, magnetic flux ($\Phi_M$) is a quantity that generally describes the magnetic field lines, which in turn graphically describe the magnetic field emitted from the north pole of a magnet. One weber of magnetic flux is equal to $1 \times 10^8$ magnetic field lines. Magnetic flux density in turn is a measure of the amount of magnetic flux per unit area of a particular section of an object, here the working gaps 40A, 40B, in a direction perpendicular to the direction of the magnetic flux, i.e., $B = \Phi_M/A$.

According to one embodiment, the MRF clutch 18 of FIG. 2 is configured to provide an optimal relationship between the thickness $t_i$, $t_o$ of the working gaps 40A, 40B. In particular, a ratio D of the gap thicknesses, hereinafter referred to as the gap thickness ratio D, is set equal to the ratio of the magnetic flux or $\Phi_M$ measured or calculated at each of the working gaps 40A, 40B, i.e., $[D = \Phi_o/\Phi_i]$. While the actual gap thickness ratio will ultimately depend upon the strength of any magnetic field generated by the magnetic field generator 41 of FIG. 2, according to one exemplary embodiment a gap thickness ratio D of approximately 0.8:1 to approximately 0.9:1 is provided in one exemplary embodiment.

Figure 3:
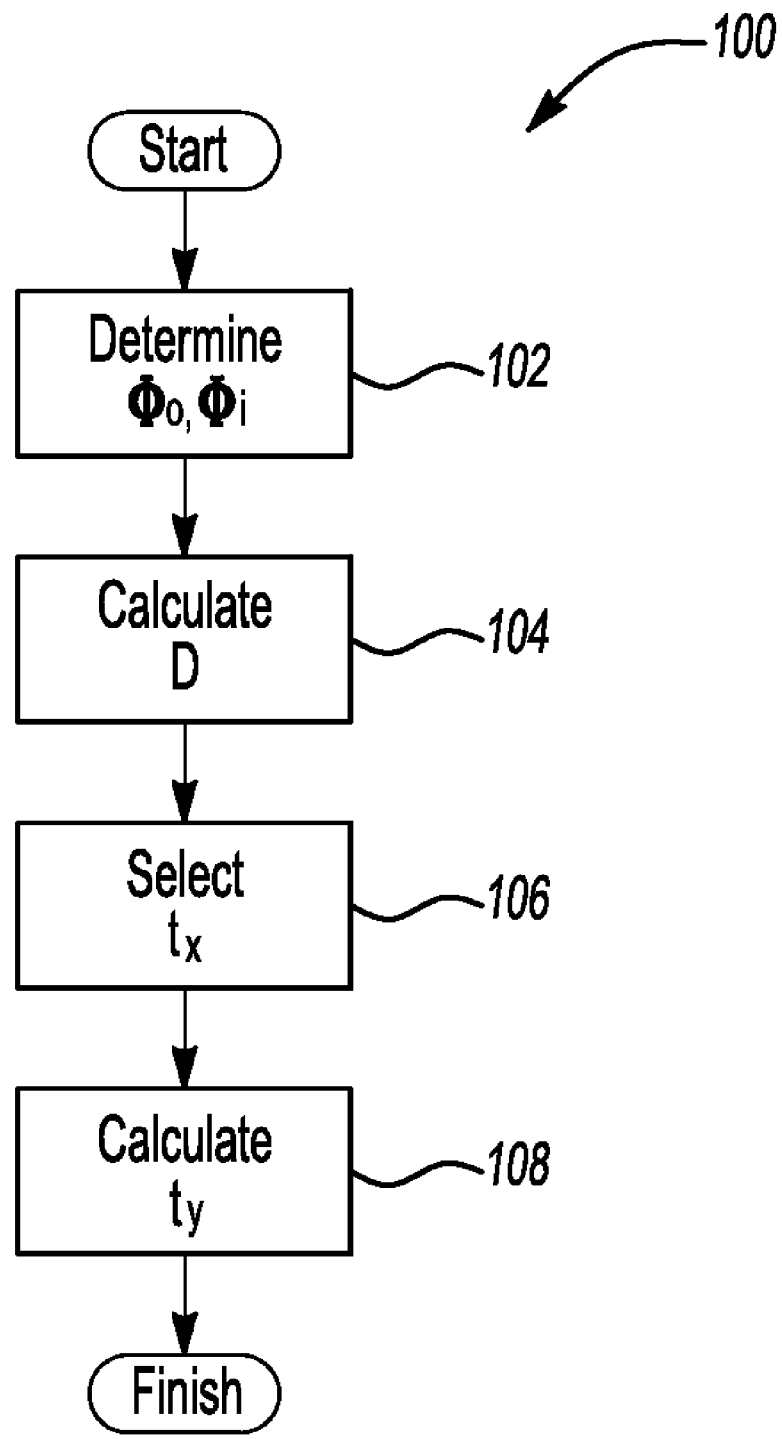
FIG. 3 is a flow chart for determining a ratio of working gap thicknesses for use with the MRF clutch of FIG. 2.

Referring to FIG. 3, in designing the MRF clutch 18 a method 100 can be used to determine a corresponding gap thickness for one of the working gaps 40A, 40B. According to the method 100, in designing the MRF clutch 18, $t_o/t_i \approx D$, again with $D = \Phi_o/\Phi_i$ as explained above. With known positions of the working gaps 40A, 40B, at step 102 the magnetic flux densities $\Phi_i$ of the inner gap 40A and $\Phi o$ of the outer gap 40B are measured, calculated, or otherwise determined. At step 104, the ratio D is calculated or otherwise determined. For exemplary modeling purposes, D is determined to be approximately 0.85 in one exemplary embodiment. Then, keeping D constant, $t_i = t_o/D$.

At step 106, a first one ($t_x$) of the gap thicknesses, i.e., $t_i$ or $t_o$, is thereafter selected based on desired torque transfer design criteria of the MRF clutch 18. By way of example, by selecting an exemplary outer gap diameter or thickness $t_o$ of 0.80 mm, at step 108 the value for the other gap thickness $t_y$, in this case the inner gap thickness $t_i$, is equal to 0.80 mm/0.85, or 0.94 mm. Therefore, in this particular example the inner gap thickness can be approximately 0.94 mm. In other words, the ratio of the magnetic flux densities $\Phi_M$ at each of the working gaps 40A, 40B is used to determine a magnetic flux density ratio (D), with the value of D then used to determine the gap thickness of one working gap given a value of the other working gap. With the gaps thickness $t_o$, $t_i$ sized in this manner, the slip power dissipated per unit volume (q''') is substantially equal in each gap. As a result, the MR fluid temperature is balanced, and the useful life of the MR clutch 18 of FIG. 3 is extended.

The example herein of a magnetic flux density ratio (D) of approximately 0.85 with an outer gap thickness of 0.80 mm is just one possible embodiment, and those of ordinary skill in the art will readily appreciate that other gap ratios can result from variations in the flux densities. That is, the configuration of the magnetic field generator 41 of FIG. 2, and to some extent the changes to the amount of electrical current passed through the field coil 33, will result in development of a modified magnetic field around the wires of the field coil 33, i.e., a stronger or weaker magnetic field (flux lines 44 of FIG. 2). The radial distance or placement of the gaps 40A, 40B relative to the magnetic field generator 41 of FIG. 2 and each other therefore will change the value of D. Likewise, changes in the composition and/or volume fraction of the MR fluid 42 used in the MRF clutch 18 may affect the value of D, without departing from the intended scope of the invention as set forth above.

While the best modes for carrying out the invention have been described in detail, those familiar with the art to which this invention relates will recognize various alternative designs and embodiments for practicing the invention within the scope of the appended claims.

The invention claimed is:

1. A magnetorheological fluid (MRF) clutch selectively connecting a rotatable first member with a rotatable second member, the MRF clutch comprising:
   a drum portion containing a magnetically-permeable stator and a magnetic core, said drum portion being operatively connected to one of the rotatable first member and the rotatable second member;
   a rotor operatively connected to the other of the rotatable first member and the rotatable second member, said rotor having a magnetically-permeable member extending axially into said drum portion, with said magnetically-permeable member at least partially defining an outer working gap in conjunction with said magnetically-permeable stator and an inner working gap in conjunction with said magnetic core;
   magnetorheological (MR) fluid substantially filling each of said inner working gap and said outer working gap; and
   a magnetic field generator positioned radially inward of the magnetically-permeable member, embedded in said magnetic core, and operable for generating a magnetic field suitable for changing an apparent viscosity of said MR fluid, wherein the inner working gap is radially inward of the outer working gap relative to the magnetic field generator;
   wherein a ratio of a thickness of said outer working gap to a thickness of said inner working gap equals a ratio of magnetic flux in the outer working gap to magnetic flux in the inner working gap, such that slip power dissipated per unit volume in said inner working gap is equal to slip power dissipated per unit volume in said outer working gap.

2. The MRF clutch of claim 1, wherein said ratio of a thickness of said outer working gap to said inner working gap is approximately 0.75:1 to approximately 0.9 to 1.

3. The MRF clutch of claim 1, wherein said inner gap thickness is approximately 0.90 to 1 mm, and said outer gap thickness is approximately 0.75 to 0.85 mm.

4. The MRF clutch of claim 1, wherein said MR fluid includes magnetizable particles in a volume fraction of approximately 40 to 50 percent.

5. A magnetorheological fluid (MRF) clutch for selectively transmitting torque from a rotatable input member to a rotatable output member, the MRF clutch comprising:
   a rotatable drum that is operatively connected to the rotatable output member to rotate in conjunction therewith, said drum containing a magnetically-permeable stator and a magnetic core containing a magnetic field generator operable for generating a magnetic field;
   a rotor connected to the rotatable input member to rotate in conjunction therewith, said rotor having a magnetically-permeable and axially-extending member positioned radially outward of the magnetic field generator and enclosed by said drum to thereby at least partially define an inner working gap in conjunction with said magnetic core and to at least partially define an outer working gap positioned radially-outward of said inner working gap; and
   magnetorheological (MR) fluid substantially filling said inner working gap and said outer working gap, said MR fluid having a variable apparent viscosity that changes in response to changes in said magnetic field;
   wherein said inner working gap has a uniform first thickness, and wherein said outer working gap has a uniform second thickness that is less than said first thickness, said first thickness and said second thickness having a predetermined outer-to-inner gap thickness ratio that equals a ratio of magnetic flux in the outer working gap to magnetic flux in the inner working gap, such that slip power dissipated per unit volume in said outer working gap is equal to slip power dissipated per unit volume in said inner working gap.

6. The MRF clutch of claim 5, further comprising a battery, wherein said magnetic field generator includes a field coil that is electrically connected to said battery for generating said magnetic field in response to electrical energy supplied from said battery.

7. The MRF clutch of claim 5, wherein said MR fluid contains magnetizable particles in a volume fraction of approximately 40 to 50 percent.

8. The MRF clutch of claim 5, wherein the rotatable input member is configured as an input shaft of a transmission, and wherein the rotatable output member is an output shaft of said transmission.

9. The MRF clutch of claim 5, wherein the rotatable input member is configured as an input shaft of a transmission, and wherein the rotatable output member is configured as an input shaft of an auxiliary system.

10. A vehicle comprising:
    an engine having an output shaft;
    a transmission having an input shaft that is operatively connectable to said output shaft of said engine;
    a multi-gap magnetorheological fluid (MRF) clutch assembly having an input member connected to one of said output shaft of said engine and said input shaft of said transmission, said multi-gap MRF clutch assembly including:
       a rotatable drum connected to said output member, a rotor connected to said input member and having:
          a magnetically permeable axial member that extends at least partially into the drum;
          magnetorheological (MR) fluid; and
          an electromagnet embedded in a magnetic core radially inward of the axial member, wherein said rotatable drum contains said magnetic core; and
       a battery that is electrically connectable to said electromagnet, wherein a supply of energy from said battery to said electromagnet generates a magnetic field adapted to change an apparent viscosity of said MR fluid to thereby transfer torque from said input member to said output member;

wherein:

said axial member of the rotor at least partially defines each of a plurality of working gaps containing said MR fluid;

any given adjacent pair of said working gaps includes an inner working gap and an outer working gap, with the inner working gap being radially inward of the outer working gap relative to the electromagnet; and an inner-to-outer gap thickness ratio for the given adjacent pair is greater than approximately 1.10:1 and equals a ratio of a magnetic flux in the respective inner and outer working gaps, thereby providing slip power dissipated per unit volume of said MR fluid in said inner working gap at a level that is substantially equal to slip power dissipated per unit volume of said MR fluid in said outer working gap for the given adjacent pair.

11. The vehicle of claim 10, wherein said inner working gap for the given adjacent pair is approximately 10 to 15 percent larger than said outer working gap.

12. The vehicle of claim 11, wherein said outer working gap for the given adjacent pair is approximately 0.80 mm to 0.85 mm, and wherein said inner working gap for the given adjacent pair is approximately 0.90 mm to 1.0 mm.

13. The vehicle of claim 10, including an auxiliary system having an input shaft, wherein said an output member of said MRF clutch is continuously connected to said input shaft of said auxiliary system.

* * * * *